United States Patent Office 3,838,086
Patented Sept. 24, 1974

3,838,086
ISOLATING RUBBERS
Hildegard Schnöring, Wuppertal-Elberfeld, Gottfried Pampus, Leverkusen, and Rudolf Mayer-Mader, Cologne, Germany, assignors to Bayer Aktiengesellschaft, Leverkusen, Germany
No Drawing. Filed Mar. 26, 1973, Ser. No. 344,914
Claims priority, application Germany, Mar. 29, 1972, P 22 15 413.8
Int. Cl. C08b 21/32; C08c 11/22, 11/36
U.S. Cl. 260—30.6 R         8 Claims

ABSTRACT OF THE DISCLOSURE

A process for isolating rubbers from their aqueous dispersions (latices) comprising adding methyl cellulose to an aqueous rubber dispersion in a quantity of from 0.1 to 10% by weight based on the rubber, and removing the water present.

---

This invention relates to a process for isolating rubbers from their aqueous dispersions (latices). The process according to the invention comprises adding methyl cellulose to an aqueous rubber dispersion in a quantity of from 0.1 to 10% by weight, preferably in a quantity of from 2 to 10% by weight, based on the rubber, and removing the water present in this mixture.

In one preferred embodiment of the process, a 0.1 to 10% by weight aqueous solution of methyl cellulose is initially added to a rubber dispersion in such a quantity that the resulting mixture contains from 0.1 to 10% by weight, preferably from 2 to 10% by weight, of methyl cellulose, based on the rubber, and thereafter the resulting mixture is mixed with water in such a quantity that the rubber precipitates. The coagulate is then mechanically separated off, optionally washed with water and the remaining water removed. This leaves a coagulate which is almost completely free from contaminants, such as emulsifiers, catalyst residues and the like. Such contaminants are removed together with the water during separation of the coagulate, and any contaminating residues still left can be washed out with water.

In context of this invention, rubbers include any synthetic rubbers of the kind used as elastomers, binders or coating agents. Examples of rubbers include diene rubbers such as homopolymers of conjugated diolefins having preferably 4 to 8 carbon atoms (butadiene, isoprene, piperylene and chloroprene) and copolymers of conjugated diolefins with ethylenically unsaturated compounds, for example aliphatic vinyl compounds and aromatic vinyl compounds. The following are mentioned as examples: acrylic acid and methacrylic acid derivatives, such as acrylonitrile, acrylamide, methacrylonitrile, methacrylamide, acrylic acid alkyl esters having 1 to 6 carbon atoms (ethyl acrylate and butyl acrylate), methacrylic acid alkyl esters having 1 to 6 carbon atoms (methyl methacrylate), also styrene, α-methyl styrene, vinyl toluene, vinyl pyridine, divinyl benzene, copolymers of ethylene with vinyl acetate or vinyl chloride or copolymers of acrylic esters.

Of this group of rubbers, the following are preferred: polybutadiene, styrene/butadiene copolymers, butadiene/acrylonitrile copolymers, polychloroprene, polyisoprene and acrylic ester copolymers. All these rubbers can be used regardless of their steric configuration. This means that the arrangement of the double bonds can be either cis or trans, that the dienes can be polymerised in the 1,4-, 3,4- or 1,2-position and that, in the case of copolymers, the distribution of the monomer units can be statistical, alternating or block-like.

Other suitable rubbers include ethylene-propylene rubbers and ethylene-propylene terpolymers. The ratio of ethylene to propylene is generally in the range of 80:20 to 20:80, the tercomponent is preferably present in quantities of from 2 to 20% by weight and represents a non-conjugated diolefin, such as norbornadiene, 1,4-hexadiene or ethylidene norbornene.

Polyalkenamer rubbers obtained by the ring-opening polymerisation of cyclic olefins, are also suitable. Homopolymers of cyclomono-olefins having 4,5 and 7–12 carbon atoms, for example trans-polypentenamer, are of particular interest. These rubbers, produced by solution polymerisation with organometallic mixed catalysts or with metal alkyls, are converted by methods known per se into solvent-free dispersions or latices with known emulsifiers or in accordance with German Offenlegungsschrift No. 2,013,359. These dispersions are then further processed into rubber powders in accordance with the invention.

The aforementioned rubbers can contain up to 50% by weight of conventional rubber extending oils (for example paraffinic or aromatic mineral oils) or conventional plasticisers (such as dioctyl phthalate or tricresyl phosphate or low molecular weight polyethers). Conventional vulcanising agents may also be incorporated into these rubbers.

Microstructure, molecular weight and gel content of the rubbers are not critical. It is possible to use rubbers with molecular weights as low as a few thousand.

During their preparation, many of these rubbers are directly obtained as aqueous dispersions (latices) or they can readily be converted into latex form. These latices generally contain from 10 to 60% by weight of rubber, based on the total quantity of latex.

Since rubbers are tacky products in their crude state, they are extremely difficult to isolate as solids either from solutions in organic solvents or from latices. In recovering processes of this kind, the rubber is generally obtained in the form of tacky crumbs.

The process according to this invention is preferably applied to rubber latices stabilised with anionic emulsifiers. Examples of such emulsifiers, which are preferably present in quantities of from 0.1 to 5% by weight, based on the rubber, include long-chain fatty acids, resinic acids, disproportionated abietic acids and their condensates with formaldehyde, alkyl and alkylarylsulphonates and sulphates. Alkali metal (sodium, potassium)-salts of alkyl or alkylaryl sulphates and sulphonates are particularly preferred. Alkyl radicals are preferably those having 8 to 20 carbon atoms; alkylaryl radicals are preferably combinations of aryl radicals having 6 to 20 carbon atoms and alkyl radicals having 2 to 20 carbon atoms. Phenyl and naphthyl are examples of aryl radicals. Special emulsifiers are sodium salts of alkyl sulphonates having an average of 14 carbon atoms in the alkyl radical, sodium salts of diisobutyl naphthalene sulphonic acid, sodium salts of the condensation product of formaldehyde and naphthalene sulphonic acid, sodium salts of isobutyl naphthalene sulphonic acid.

Latices stabilised in this way and their production are known. In principle, they are prepared by adding an activator to an aqueous emulsion containing the monomers and the emulsifier, effecting polymerisation, and adjusting the solids content of the resulting polymer dispersion to the required concentration (for example from 30 to 60% by weight).

On completion of polymerisation, the residual monomers can be removed, the molecular weight of the polymer influenced during polymerisation by regulators, and stabilisers and/or antiagers added to the latex. It is also possible to mix in fillers (carbon black, silicates), other solids, vulcanisation agents and vulcanisation accelerators.

The methyl cellulose are commercially available cellulose derivatives produced by conventional processes with a degree of substitution in the range of from 0.8 to 2.0, in other words each anhydroglucose unit has an average of 0.8 to 2.0 methoxyl groups. The molecular weight of the methyl cellulose is not critical either. Thus methyl celluloses having a viscosity of from 10 to 10,000 cp. in a 2% by weight aqueous solution are suitable.

However, it is preferred to use methyl cellulose having viscosities of from 1500 to 4000 cp., in 2% by weight aqueous solution.

The process according to the invention can be carried out for example as follows. Methyl cellulose, for example in the form of an aqueous solution, is added to a rubber latex, the quantity of methyl cellulose being adjusted in such a way that from 0.5 to 15, preferably from 1 to 10 and, most advantageously, from 1 to 5 parts by weight of methyl cellulose are present per 100 parts by weight of rubber. The resulting mixture has a considerably higher viscosity than the rubber latex on its own.

The rubber precipitates on addition of water, particles of from about 3 mm. to about $100\mu$ in diameter being formed. Depending upon the specific gravity of the rubber, the coagulate either creams (i.e. it collects on the surface of the liquid), or sediments and can readily be separated off from the major quantity of the aqueous phase formed. In this way, all water soluble impurities present in the rubber latex are substantially removed, especially emulsifiers and water-soluble catalyst residues. Surprisingly, the resulting coagulate particles do not stick together. In order further to reduce their contaminants content, the particles can be washed with pure water. The particles which still have a high water content are then dried. The rubber particles are kept in motion and prevented from caking together during drying so that a free-flowing dry rubber powder is formed. Thus, drying is effected in a "state of motion" which is generated for example by fluidising or stirring the particles, e.g. by using a pneumatic conveying dryer or a similar machine. The intensity of agitation cannot generally be specified. It must be sufficient to prevent caking and can readily be determined from case to case. If the particles are dried without agitation the solid rubber is obtained in a form which can readily be converted into a compact mass (for example in the form of a strand) by conventional methods. The coagulate can also be further processed in conventional screw machines into compact rubber.

The size of the particles obtained is governed primarily by the quantity of water added. This should preferably be within the range of from 2 to 10 times the volume of the quantity of latex. The size of the particles is also governed by the temperature of the water added. Basically, it is possible to work at temperatures in the range of from 0 to 100° C., although it is preferred to use water of a temperature of from 25 to 80° C. The particle size increases with increasing water temperature. The latex is preferably slowly added to the water with intensive mechanical admixture, for example, vigorous stirring.

The most favourable quantity of water, water temperature and stirring intensity for obtaining an optimum result must be determined in each individual case. They are governed by the type and concentration of the latex to be treated and also by the kind and quantity of emulsifiers present. None of the aforementioned factors is so critical that only certain combinations lead to the required result. The optimum combination can readily be determined in each case by a few preliminary tests.

Another possibility of carrying out the process is to subject a mixture of rubber latex and methyl cellulose directly to a spray drying process. In this embodiment the rubber is always obtained in powder form and there is no need to add large quantities of water, but all contaminants remain in the rubber.

As a particular advantage of the procedure according to the invention effluent pollution problems in processing the latices into solid rubber are completely avoided. Whereas conventional precipitation processes for recovering rubbers from latices necessitate adding of electrolytes, the only additive in the process of this invention is a small quantity of methyl cellulose, which remains to some extent in the solid rubber. Accordingly, water containing emulsifier and methyl cellulose is the only waste product formed and, providing the emulsifiers are suitably selected, this product can readily be biologically purified and if desired, the methyl cellulose can readily be precipitated therefrom. By virtue of the process according to this invention, rubbers are obtained in the form of a readily handled, free-flowing powder so that further processing and introducing of additives is made very much easier.

SPECIFICATIONS FOR THE PREPARATION OF RUBBER LATICES

Specification A

There were introduced into a 40-litre capacity autoclave equipped with a stirrer, thermometer, inlet pipes and a cooling system: 12 litres of desalted water, 470 g. of a mixture of sodium alkyl suphonates having an average of 14 carbon atoms in the chain, 60 g. of a condensation product of alkyl naphthalene sulphonic acid and formaldehyde.

Thereafter, 5500 g. of a acrylonitrile and 37.5 g. of tert.-dodecyl mercaptan were introduced and subsequently 9000 g. of butadiene under pressure. The polymerisation was initiated by an activator system of:

12 g. of sodium sulphoxylate, 12 g. of tert.-butylhydroperoxide, 7.5 g. of a 1% iron (II) sulphate solution.

The reaction mixture was heated to 24° C. Samples were taken at intervals of 2 hours and their polymer content was determined. This is done by coagulating the latex with methanol. When the latex had a solids content of 2%, 30 g. of tetrasodium pyrophosphate in 945 g. of desalted water were added to the reaction mixture. When the solids content reached 6%, a solution of 30 g. of tert.-dodecyl mercaptan in 37.5 g. of acrylonitrile was added. At a latex concentration of 20%, the temperature was increased to 30° C. and a mixture of the following composition was added: 750 g. of a mixture of sodium alkyl sulphonates having an average of 14 carbon atoms in the chain and 60 g. of a condensation product of alkyl naphthalene sulphonic acid and formaldehyde in 3000 g. of desalted water.

When a latex concentration of approximately 43 to 44% had been reached, polymerisation was terminated by adding a solution of: 150 g. of sodium dithionite, 120 g. of a reaction product of 1 mol of stearyl alcohol with approximately 20 mols of ethylene oxide and 7.5 g. of the sodium salt of ethylene diamine tetraacetic acid in 1035 g. of desalted water.

The resulting latex was stabilised with a mixture of 300 g. of a styrenised xylonol and a diphenyl amine.

The residual monomers were removed *in vacuo.*

Specification B

There were introduced into a 40-litre capacity autoclave: 10.6 litres of desalted water, 250 g. of a mixture of sodium alkyl sulphonates having an average of 14 carbon atoms in the alkyl group and 444 g. of methacrylic acid. This was followed by the addition of a solution containing 600 g. of a long-chain fatty acid mixture of fatty acids having 12 to 18 carbon atoms dissolved in 310 g. of acrylonitrile. 8 g. of diisopropyl xanthogene disulphide were then added and the reaction vessel was flushed with nitrogen. 6000 g. of butadiene were then introduced under pressure, followed by heating to 35° C. Polymerisation was initiated with a catalyst system of: 2 g. of potassium persulphate, 10 g. of the sodium salt of an alkyl sulphinic acid having 14 carbon atoms dissolved in 400 g. of pure water. At a solids content of 6% and 10% a solution containing 20 g. of diisopropyl xanthogene disulphide in 200 g. of acrylonitrile was added.

At a latex concentration of 15% and 25%, an emulsion of the following constituents was added: 4000 g. of a 5% solution of the sodium salt of isobutyl naphthalene sulphonic acid, 1 g. of potassium persulphate, 5 g. of the sodium salt of an alkyl sulphinic acid having 14 carbon atoms.

At a latex concentration of 30%, polymerisation was terminated by adding a short-stop solution of: 75 g. of sodium dithionite, 5 g. of the sodium salt of alkylene diamine tetraacetic acid in 750 g. of pure water.

After the residual monomers had been removed, the latex was stabilised as in Specification A.

Specification C

The polymerisation mixture contained: 14,000 g. of desalted water, 260 g. of the sodium salt of diisobutyl naphthalene sulphonic acid, 40 g. of the sodium salt of the condensation product of naphthalene sulphonic acid and formaldehyde, 60 g. of coconut oil fatty acid, 11.2 g. of caustic soda, 80 g. of tetrasodium pyrophosphate, 2520 g. of acrylonitrile, 28 g. of tert-dodecyl mercaptan, 32 g. of divinyl benzene and 5440 g. of butadiene.

At a temperature of 40° C., polymerisation was initiated by adding in succession: 0.6 g. of cumene hydroperoxide, 0.8 g. of formaldehyde sulphoxylate, 1.2 g. of the sodium salt of ethylene diamine tetra acetic acid and 0.1 g. of iron (II) sulphate.

When the latex had a solids content of 9% and of 20%, a solution of 16 g. of divinyl benzene, 16 g. of tert.-dodecyl mercaptan and 8 g. of toluene was added to it.

At a solids content of 20%, 80 g. of the sodium salt of diisobutyl naphthalene sulphonic acid in 800 g. of desalted water were added.

At a solids content of 31%, a solution of 60 g. of sodium dithionite, 6000 g. of desalted water and 2 g. of the sodium salt of diisobutyl naphthalene sulphonic acid was added to short stop the polymerisation.

After the residual monomer had been removed, the latex was stabilised with 100 g. of an antiager.

Specification D

The polymerisation mixture contained: 1400 g. of desalted water, 260 g. of the sodium salt of diisobutyl naphthalene sulphonic acid, 40 g. of the sodium salt of the condensation product of naphthalene sulphonic acid and formaldehyde, 60 g. of coconut oil fatty acid, 11.2 g. of caustic soda, 80 g. of tetrasodium pyrophosphate, 2550 g. of acrylonitrile, 28 g. of tert.-dodecyl mercaptan and 5440 g. of butadiene.

At a temperature of 40° C., polymerisation was initiated by adding in succession: 0.6 g. of cumene hydroperoxide, 0.8 g. of formaldehyde sulphoxylate, 0.1 g. of iron (II) sulphate, 1.2 g. of the sodium salt of ethylene diamine tetra acetic acid.

At a solids content of 9% and of 20% 16 g. of tert.-dodecyl mercaptan dissolved in 8 g. of toluene were added.

At a solids content of 20%, 80 g. of the sodium salt of diisobutyl naphthalene sulphonic acid in 800 g. of desalted water were added. When the latex had a solids content of 31%, 60 g. of sodium dithionite in 6000 g. of desalted water and 2 g. of the sodium salt of diisobutyl naphthalene sulphonic acid were added as a short-stop agent.

After the residual monomer had been removed, 100 g. of an antiager were added to the latex.

Specification E

The emulsion used for polymerisation contained: 14,400 g. of desalted water, 600 g. of the sodium salt of a disproportionated abietic acid, 6 g. of sodium hydroxide, 60 g. of tetra sodium pyrophosphate, 60 g. of the sodium salt of the condensation product of naphthalene sulphonic acid and formaldehyde, 3000 g. of styrene and 60 g. of n-dodecyl mercaptan. 9000 g. of butadiene were then introduced under pressure.

After the autoclave had been adjusted to a temperature of 20° C., polymerisation was initiated by adding 100 ml. of solution (1) and of solution (2).

(1) 1000 g. of desalted water, 50 g. of the sodium salt of a disproportionated abietic acid, 5 g. of the sodium salt of the condensation product of naphthalene sulphonic acid and formaldehyde, 40 g. of cumene hydroperoxide.

(2) 1100 g. of desalted water, 10 g. of tetra sodium pyrophosphate, 1 g. of the sodium salt of ethylene diamine tetra acetic acid, 0.5 g. of iron (II) sulphate and 47.2 g. of formaldehyde sulphoxylate.

At a monomer conversion of approximately 75%, the residual monomer was removed by degassing and 120 g. of an antiager were added to the latex.

Specification F

The emulsion contained: 300 g. of chloroprene, 0.03 g. of tert.-butyl pyrocatechol, 360 g. of desalted water, 13.5 g. of the sodium salt of a disproportionated abietic acid, 2.1 g. of the sodium salt of the condensation product of naphthalene sulphonic acid and formaldehyde, 1.5 g. of caustic soda and 1.5 g. of tetra sodium pyrophosphate.

A 3% aqueous formamidine sulphinic acid was used as catalyst. The polymerisation temperature was 45° C. At a monomer conversion of 65 to 70%, the residual monomer was removed by steam distillation. The latex was then further processed in the usual way.

Specification G

The emulsion to be polymerised contained: 200 g. of chloroprene, 0.02 g. of tert.-butyl pyrocatechol, 1.2 g. of sulphur, 1 g. of triisopropanolamine, 240 g. of desalted water, 9 g. of the sodium salt of a disproportionated abietic acid, 1.4 g. of the sodium salt of the condensation product of naphthalene sulphonic acid and formaldehyde, 1 g. of caustic soda, 1 g. of tetrasodium pyrophosphate.

Polymerisation was effected with a catalyst solution of: 0.04 g. of potassium peroxy disulphate, 0.004 g. of β-anthraquinone sulphonic acid, 1.3 g. of desalted water.

The polymerisation temperature was 45° C. At a monomer conversion of 65 to 70%, polymerisation was stopped by adding a solution of 0.05 g. of phenothiazine in 2 g. of toluene. The residual monomer was removed from the latex by steam distillation. The resulting latex can be processed directly or alternatively can be post treated by adding 2.5 parts by weight of tetra ethyl thiuram disulphide per 100 parts by weight of polymer in the latex and stirring at 50° C. until the required polymer viscosity is obtained. The latex is then further processed as usual.

Specification H

The emulsion contained: 190 g. of chloroprene, 5 g. of dichlorobutadiene, 0.02 g. of tert.-butyl pyrocatechol, 240 g. of desalted water, 9 g. of the sodium salt of a disproportionated abietic acid, 1.4 g. of the sodium salt of the condensation product of naphthalene sulphonic acid and formaldehyde, 1 g. of caustic soda and 1 g. of tetrasodium pyrophosphate.

A 3% formamidine sulphinic acid in pure water was used as the catalyst. The residual monomer was removed by degassing at a monomer conversion of 65 to 70%.

Example 1

11.5 kg. of a 2% aqueous methyl cellulose solution were slowly added with stirring at 20° C. to 100 kg. of a 23% by weight latex obtained in accordance with Specification A. The methyl cellulose used had a degree of substitution of 1.8 and a viscosity of 4000 cp. in 1% aqueous solution. 500 kg. of water were stirred into the resulting mixture at a temperature of 20° C. Stirring was stopped after all the water had been added. At this stage the polymer had formed fine particles and creamed over a period of a few hours. It was then filtered off from the clear serum and converted by spray drying into a free-flowing rubber powder of low emulsifier content. Apart from the emulsifiers and the methyl cellulose, the serum separated off does not contain contaminants, especially no electrolytes.

Example 2

The procedure was as described in Example 1 except that 5 parts by volume of water per part of latex mixture were mixed in at 70° C. The resulting polymer flakes had a dimeter of a few mm. The flakes were separated off from the aqueous phase on a sieve belt, were washed with water, mechanically dewatered to a water content of 30 to 40%, size-reduced in a cutting mill and then dried in a pneumatic conveying dryer. A crumb-like free-flowing product was obtained.

Example 3

100 litres of a latex prepared in accordance with Specification F (instead of 300 g. of chloroprene, 270 g. of chloroprene and 30 g. of ethylene glycol dimethacrylate were polymerised) were mixed with intensive stirring with 70 litres of a 1% aqueous solution of a methyl cellulose (viscosity of the 2% solution 8000 cp., degree of substitution 1.5–2.0), and the resulting mixture was introduced with mechanical stirring into 3.5 times of its volume of water at a temperature of 90° C. Stirring was effected by a mechanically driven disc stirrer rotating at 120 r.p.m.

Example 4

0.8 litre of a 2% aqueous methyl cellulose solution was added per litre of the latex prepared in accordance with Specification F (polymerisation temperature 10° C.), followed by heating with stirring to 40–50° C. This mixture and water of 70° C. were introduced into a flow mixer in a ratio by volume of 1:4. The polymer particles formed were mechanically dewatered to a solids content of 70–80%. The highly compact moist product obtained was cut in a cutting mill to a grain size of from 2 to 3 mm. and then dried in a tumbler dryer. A very coarse, free-flowing rubber powder with predominantly spherical particles was formed.

Example 5

100 litres of latex prepared in accordance with Specification D were blended with 42 litres of a 2% aqueous methyl cellulose solution (viscosity of the 2% solution 400 cp., degree of substitution 1.1–1.4). This mixture and at the same time 3 times its quantity by volume of water at 50° C. were introduced into a flow mixer. The polymer particles formed were washed with warm water, mechanically dewatered to a solids content of from about 40 to 50% and the resulting solids paste was introduced into fluidized bed equipped with a stirrer. The fluidized bed initially functions as a stirred bubble column because the warm air passes upwards through the stirred paste. As drying increases, the normal operational state of a stirred fluidized bed was achieved. On completion of drying, an extremely fine free-flowing rubber powder was obtained.

Example 6

Into 100 litres of the latex prepared in accordance with Specification D with a polymer content of 30%, there were stirred 75 litres of a 2% aqueous methyl cellulose solution (viscosity 4,000 cp., degree of substitution 1.5–20), and the resulting mixture was stirred into 800 litres of water at 80° C. The rubber particles formed are readily filtered off and the hot filter cake, containing approximately 40% of water, readily disintegrated back into crumbs which were dried in a pneumatic conveying dryer.

Example 7

Into 100 litres of latex prepared in accordance with Specification D having a polymer content of 48% there were stirred 170 litres of the methyl cellulose solution of Example 6 and the resulting product was stirred into 1300 litres of water at 90° C. The coagulate was dewatered to a water content of approximately 50% under light pressure on a sieve belt and the resulting mass was passed through a sieve with 2 mm. meshes and the resulting crumbs were dried with stirring in a fluidized bed to form a powder.

Example 8

Into 3600 litres of a latex prepared in accordance with Specification D were stirred 900 litres of a 2% aqueous methyl cellulose solution (viscosity 4000 cp., degree of substitution 1.5–2.0) and the resulting mixture was blended with 100 litres of water, heated to 40° C. and then creamed for 16 hours by which time 2275 litres of a clear serum had formed. The serum was separated off and found to contain approximately 50% of the emulsifier and 10% of the methyl cellulose used. The solids concentrate formed, i.e. the creamed polymer rich, viscous phase was then delivered together with 6 times its volume of water at 70° C. to an impeller homogeniser and the product of low emulsifier content formed dewatered on a sieve belt and then introduced into a dryer by means of a spraying disc. A crumb-like emulsifier-free rubber powder was formed.

Example 9

Into 100 litres of the latex prepared in accordance with Specification D were stirred 36 litres of a 2% aqueous methyl cellulose solution (viscosity of the 2% solution 4000 cp., degree of substitution 1.5–2.0). This mixture was stirred into 600 litres of water at approximately 20° C., and stirring was continued for 30 minutes. The polymer particles formed were mechanically dewatered to a residual moisture content of 30–40%, subsequently passed through a continuous sieve to loosen up the rubber crumbs and dried in a stirred fluidized bed. A free-flowing powder was formed.

Example 10

1. Into 100 litres of the latex prepared in accordance with Specification E were stirred 40 litres of a 5% aqueous methyl cellulose solution (viscosity of the 2% solution 50 cp., degree of substitution 1.6–1.9). This mixture was stirred into 600 litres of water at 80° C. The polymer particles formed were separated off from the serum on a sieve, washed with water and filtered off (residual polymer content 50%). The matted filter cake thus formed was cut by a rotating cutting ring and the resulting crumbs were dried in a pneumatic conveying dryer. A free-flowing crumb-like rubber powder with a pronounced soft grain was formed.

2. 100 litres of the latex prepared in accordance with Specification E were blended with 90 litres of a 2% aqueous methyl cellulose solution (viscosity of the 2% solution 4000 cp., degree of substitution 1.54–2.03), after which the procedure was as in (1). A free-flowing rubber powder with a particularly hard grain was formed.

Example 11

Into 100 litres of the latex prepared in accordance with Specification C were stirred 36 litres of a 2% aqueous methyl cellulose solution (viscosity of the 2% solution 4000 cp., degree of substitution 1.7–1.8), and the resulting mixture was stirred into 5.5 times its quantity of water at 50° C. The flakes thus formed were mechanically dewatered to a solids content of approximately 70%, size-reduced in a cutting mill and the resulting crumbs were dried in a fluidized bed. A free-flowing rubber powder with an average grain size of 0.5 to 3 mm. was formed.

Example 12

75 litres of the latex prepared in accordance with Specification C were heated to 40° C. and stirred together with 18.7 litres of a 2% aqueous methyl cellulose solution (viscosity 4000 cp., degree of substitution 1.5–2.0) followed by dilution with 375 litres of water at a temperature of 40° C. at which temperature the mixture was maintained for the next 12 hours, by which time 312 litres of a clear serum had formed. The serum was then separated off and found to contain 80% of the emulsifier used for polymerisation but practically no methyl cellulose. The creamed, latex-rich phase was then dewatered in a spray dryer. A dust-fine rubber powder of low emulsifier content was formed.

Example 13

A latex was prepared by emulsion copolymerisation of a mixture of:

6.0 parts by weight of water;
0.15 parts by weight of benzyl dodecyl dimethyl ammonium chloride;
1.3 parts by weight of butyl acrylate; and
0.7 parts by weight of acrylonitrile.

A combination of tert.-butyl hydroperoxide and sodium formaldehyde sulphoxylate was used as activator. Polymerisation was carried out at 50° C. The latex had a solids content of 25%. 10% by weight of methyl cellulose, based on polymer, was added to the resulting latex which was then stirred slowly into 8 times its quantity by volume of water at 70° C. Flakes that are easy to handle were formed, which were then washed and dried.

Example 14

Into 100 kg. of the rubber latex according to Specification C were stirred 11.5 kg. of the aqueous methyl cellulose solution of Example 1. The resulting mixture was delivered to a flow mixer into which 5 times the quantity by volume of water at 20° C. was simultaneously introduced. A flocculate occluding high amounts of water with a marked tendency towards coagulation was obtained at the outlet end of the mixer. This product was worked into a strand on pressure rollers and then processed in the usual way.

Example 15

The procedure was as in Example 2, except that 5 parts by volume of water per part of latex mixture were introduced at 70° C. into a flow mixer. The flocs thus obtained had a diameter of a few mm. After leaving the flow mixer, they were separated from the aqueous phase on a sieve belt. The flakes were then washed with warm or cold water, mechanically dewatered to a water content of 10 to 20% and then further processed in the usual way.

Example 16

1.2 kg. of methyl cellulose (viscosity of the 2% solution 50 cp., degree of substitution 1.8) were introduced into 100 litres of a latex prepared in accordance with Specification H having a polymer content of 32.3%. This latex/methyl cellulose mixture was intensively mixed with 3 times its quantity of water at 90° C. in a flow mixing tube. The resulting very coarse, tacky flakes with a diameter of approximately 5 mm. were separated off from their clear serum, on a sieve belt. They can be washed or directly consolidated into a strand.

Example 17

100 litres of latex (prepared in accordance with Specification D) were continuously mixed with 40 litres of a 2% methyl cellulose solution (viscosity 4000 cp., degree of substitution 1.5–2.0), in a mixing siren at a weight ratio of 1:0.4. This mixture was then continuously delivered to a second flow mixer in which it was mixed with 5 times its quantity by weight of water at about 80° C. The polymer flocculate issuing from the second flow mixer was separated on a sieve into extremely tacky flakes and a clear serum containing only the emulsifier. The flakes had a solids content of approximately 30% which was increased to 80–90% by mechanical dewatering on a Seiher screw.

Example 18

Into 100 litres of latex prepared in accordance with Specification G having a pH-value of 10.9 were stirred 50 litres of a 2% aqueous methyl cellulose solution (viscosity 4000 cp., degree of substitution 1.5–2.0) and the mixture introduced into 8 times its quantity of water at 60° C. The polymer flocculated in very fine form (flake size approximately 100μ) was separated off from the clear serum on a fine-mesh sieve belt, and washed neutral with water on the belt. The washed polymer was continuously removed from the belt and dewatered in a screw so that a strand of rubber was formed.

Example 19

100 litres of the latex of Example 6 were adjusted from pH 10.9 to pH 7 by adding acetic acid, after which the procedure was as described in Example 6. There was no need for the polymer to be washed on the belt.

Example 20

Into 100 litres of latex prepared in accordance with Specification F were stirred 50 litres of a 2% aqueous methyl cellulose solution (viscosity of the 2% solution 4000 cp., degree of substitution 1.5–2.0). The mixture was mixed in a flow mixer with 3 times its quantity of water at 80° C. The resulting polymer flakes were dewatered on a sieve belt, washed with cold water and then further processed in the usual way.

Example 21

100 litres of latex prepared in accordance with Specification H were mixed with 10 litres of 5% aqueous methyl cellulose solution (viscosity of the 2% solution 50 cp., degree of substitution 1.8), and the resulting mixture was heated to 50° C. and then mixed with 5 times its quantity of water at 70° C. in an impeller homogeniser. The approximately 2 mm. flakes formed which issued from the homogeniser were conducted together with the polymer-free serum into a creaming vessel. The polymer flakes floated to the top and the serum which contained only emulsifier could be run off. The polymer flakes were processed in the usual way.

Example 22

0.2 metric tons of a 10% aqueous solution of cis-1,4-polyisoprene in hexane and 0.8 metric ton of an aqueous solution containing 0.1% by weight of isobutyl naphthalene sulphonate and 0.1% by weight of a reaction product of a copolymer of styrene-maleic acid anhydride, [($\eta$) dimethyl formamide/25° C. 5.2 molar ratio 1:1], were emulsified in an impeller apparatus. A single run through the impeller apparatus produces an emulsion in which the aqueous phase forms the outer phase and the droplets of polymer solution have a size of from 0.5 to 3μ. The hexane was distilled off from this emulsion in a stirrer vessel. This operation can be carried out at normal pressure and at the boiling temperature of the hexane/water azeotrop. In order to reduce the residual solvent content to below 1%, based on the polymer, distillation is continued until the boiling temperature is 100° C. 0.6 kg. of methyl cellulose was dissolved while stirring over a period of 30 minutes in the still hot solvent-free suspension which had a solids concentration of ~12%. The temperature of the mixture falls to 55° C. This mixture was then stirred into 300 litres of water at 80° C. The flakes formed are readily separated off from the clear serum, mechanically dewatered to a solids content of 58%, size-reduced in a cutting mill and dried in a pneumatic conveying dryer. A free-flowing polyisoprene powder was formed.

Example 23

300 l./hour of a 15% cis-1,4-polybutadiene solution in benzene and 700 l./hour of an aqueous solution of 0.15% of a reaction product of a styrene-maleic acid copolymer ([$\eta$]-dimethyl formamide 25° C.=5.2) and 2-aminoethyl methylether in a molar ratio of 1:1 and 0.05% of sodium isobutyl naphthalene sulphonate were delivered to a continuous emulsifying machine. An aqueous emulsion of the polymer solution with a particle size of from 0.8 to 4μ was obtained. The solvent was distilled off from this emulsion as in Example 22. 450 kg./hour of a solvent-free suspension were obtained into which was then stirred 90 kg. of a 1% by weight aqueous methyl cellulose solution at 20° C. This mixture which had a temperature of 60° C., was mixed with 4 times its quantity of water at 90° C. in a flow mixer. This resulted in the formation of flakes which are mechanically dewatered to a solids content of 57%, size-reduced in a cutting mill and dried in a stirred moving bed to form a fine polybutadiene powder.

What is claimed is:

1. A process for isolating a synthetic rubber from an aqueous dispersion thereof which is stabilized with an anionic emulsifier, said process comprising adding to said dispersion from 0.1 to 10% by weight, based on said rubber, of methyl cellulose having a viscosity of from 10 to 10,000 cp. in a 2% by weight aqueous solution, mixing the resulting dispersion with water until the rubber precipitates and then separating and drying the precipitate.

2. A process as claimed in claim 1, wherein the methyl cellulose is added to the rubber dispersion in the form of a 0.1 to 10% by weight solution.

3. A process as claimed in claim 1, wherein the methyl cellulose is added in a quantity of from 2 to 10% by weight.

4. A process as claimed in claim 1, wherein the precipitate which is separated off is dried in a state of motion.

5. A process as claimed in claim 1, wherein the water is removed from the mixture by spray-drying.

6. A process as claimed in claim 1, wherein the aqueous rubber dispersion contains from 0.1 to 5% by weight, based on the rubber, of an alkali metal salt of an alkyl or alkylaryl sulphonic acid.

7. A process as claimed in claim 1, which is carried out at a temperature in the range of from 25 to 80° C.

8. A process as claimed in claim 1, wherein the aqueous rubber dispersion contains up to 50% by weight based on the rubber of an extending oil and/or a plasticiser.

References Cited

UNITED STATES PATENTS

| | | | |
|---|---|---|---|
| 2,875,101 | 2/1959 | Ehrlich | 117—121 |
| 2,692,245 | 10/1954 | Groves et al. | 260—3 |
| 2,880,184 | 3/1959 | Groves et al. | 260—3 |
| 2,715,115 | 8/1955 | Blanchette et al. | 260—17 R |

ALLAN LIEBERMAN, Primary Examiner

H. H. FLETCHER, Assistant Examiner

U.S. Cl. X.R.

260—17 R, 29.7 EM, 29.7 NR, 29.7 PT, 31.8 DR, 33.2 R, 33.6 AQ